(12) United States Patent
Hyde et al.

(10) Patent No.: US 7,419,098 B2
(45) Date of Patent: Sep. 2, 2008

(54) GRAPHICAL CODE READING APPARATUS FOR READING CODES ON REFLECTIVE SURFACES

(75) Inventors: Ryan Hyde, Draper, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 126 days.

(21) Appl. No.: 10/979,389

(22) Filed: Nov. 2, 2004

(65) Prior Publication Data

US 2006/0091214 A1    May 4, 2006

(51) Int. Cl.
   *G06K 7/10*    (2006.01)
(52) U.S. Cl. .............................. 235/462.43; 235/462.37; 235/462.42
(58) Field of Classification Search ............. 235/462.43, 235/462.37, 462.42, 454, 462.35
   See application file for complete search history.

(56) References Cited

U.S. PATENT DOCUMENTS

| 5,149,948 | A |   | 9/1992  | Chisholm |
| 5,198,650 | A | * | 3/1993  | Wike, Jr. ............... 235/462.45 |
| 5,406,060 | A |   | 4/1995  | Gitin |
| 5,449,892 | A | * | 9/1995  | Yamada ................. 235/462.42 |
| 5,604,550 | A | * | 2/1997  | White ......................... 396/429 |
| 5,764,874 | A | * | 6/1998  | White ......................... 396/155 |
| 5,825,011 | A | * | 10/1998 | Suzuki et al. ........... 235/472.01 |
| 6,003,775 | A | * | 12/1999 | Ackley .................. 235/472.01 |
| 6,033,090 | A | * | 3/2000  | Seo ............................. 362/252 |
| 6,078,426 | A | * | 6/2000  | Siegfried .................... 359/599 |
| 6,105,869 | A | * | 8/2000  | Scharf et al. ................ 235/454 |
| 6,273,338 | B1 | * | 8/2001 | White .................... 235/462.42 |
| 6,595,422 | B1 | * | 7/2003 | Doljack ................. 235/462.42 |
| 6,622,915 | B2 | * | 9/2003 | Ishikawa ..................... 235/454 |
| 6,803,088 | B2 | * | 10/2004 | Kaminsky et al. ........... 428/141 |
| 6,854,650 | B2 | * | 2/2005 | Hattersley et al. ........... 235/454 |
| 7,017,817 | B2 | * | 3/2006 | Ito et al. ................ 235/462.42 |

FOREIGN PATENT DOCUMENTS

WO    WO 94/22104    9/1994

* cited by examiner

*Primary Examiner*—Ahshik Kim
(74) *Attorney, Agent, or Firm*—Madson & Austin (57) ABSTRACT

A graphical code reading apparatus is disclosed. The graphical code reading apparatus is able to read graphical codes on reflective and curved reflective surfaces. The graphical code reading apparatus includes a graphical code reader having an illumination source such as LEDs and a detector such as an imager. The graphical code reading apparatus also includes a light scattering chamber that is coupled to the graphical code reader. The light scattering chamber may have two openings, namely a first opening for receiving the graphical code reader and a second opening for placement adjacent the graphical code. The light scattering chamber may be tapered from the first opening toward the second opening. An interior surface of the light scattering chamber is capable of scattering light because it may be an irregularly uneven reflective surface. The light impinges the reflective surface at multiple angles of incidence upon exiting the light scattering chamber. The light scattering chamber may further be configured with a transmissive diffuser insert.

24 Claims, 6 Drawing Sheets

GRAPHICAL CODE READING APPARATUS FOR READING CODES ON REFLECTIVE SURFACES

TECHNICAL FIELD

The present invention relates generally to graphical code readers. More specifically, the present invention relates to an apparatus used with graphical code readers that is configured to read graphical codes on reflective surfaces.

BACKGROUND

A machine-readable graphical code ("graphical code") is a graphical representation of information that consists of multiple graphical code elements having different light reflective or light emissive properties. Examples of different types of graphical codes include bar codes, data matrix codes, Maxi-Codes, optical character recognition ("OCR") text, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Image-based graphical code readers typically include one or more light sources for illuminating a graphical code. Light is reflected from the graphical code toward the graphical code reader. A lens within the graphical code reader focuses an image of the graphical code onto an image sensor over a period of time commonly referred to as an exposure period. Following the exposure period, pixels within the image sensor are read electronically to provide a two-dimensional array of image data corresponding to the graphical code. The image data is then multiplied by a gain. A decoder processes the gain-adjusted image data and extracts the information contained in the graphical code.

Different types of graphical codes include different types of graphical code elements. For example, bar codes include variable-width rectangular bars. Data matrix codes include square data modules. MaxiCodes include a central finder pattern and a grid of hexagons surrounding the central finder pattern.

Different types of graphical codes may vary in size. For example, bar codes are typically larger in size than data matrix codes. The graphical code elements within different types of graphical codes may also vary in size. For example, the variable-width rectangular bars in bar codes are typically larger than the square data modules in data matrix codes or the hexagons in MaxiCodes.

Two-dimensional graphical codes possess several advantages over one-dimensional graphical codes. For example, two-dimensional graphical codes are designed to store considerably more information than one-dimensional graphical codes. In addition, two-dimensional graphical codes are typically smaller than one-dimensional codes. Also, in some cases, two-dimensional graphical codes do not require a high level of print quality in order to be decoded.

One issue that arises in connection with reading both one-dimensional and two-dimensional graphical codes is the surface upon which the graphical code is placed or etched. Graphical codes are often placed onto reflective surfaces, such as on some medical instruments or automotive parts. Light incident on a reflective surface in a normal direction may be fully reflected since the surface acts similar to a mirror. Light incident on the data bars, square data modules or MaxiCode hexagons are also reflected with little attenuation. When light from a point source is reflected off of a highly reflective surface, the image sensor sees a "hot spot" or point on the surface that reflects the light from the source directly onto the imager. The hot spot has a tendency to make everything surrounding it seem very dark in contrast. This poses an image processing problem. Furthermore, the high reflectivity of both the surface and the graphical code may cause the image sensor to saturate and the graphical code information may be lost. The issues associated with graphical codes on reflective surfaces may be exacerbated when the surface is curved.

In view of the foregoing, benefits may be realized by improved illumination techniques used in conjunction with graphical code readers.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A graphical code reading apparatus for reading a graphical code on a reflective surface is disclosed. The graphical code reading apparatus includes a graphical code reader that has an illumination source and a detector. The graphical code reading apparatus also includes a light scattering chamber positioned between the graphical code reader and the relevant graphical code. The light scattering chamber includes an interior that receives electromagnetic radiation from the illumination source. The interior of the light scattering chamber also includes a light scattering surface that can scatter the electromagnetic radiation that is emitted from the illumination source of the graphical code reader.

In some embodiments, the electromagnetic radiation emitted from the illumination source is reflected randomly in multiple directions when the radiation interacts with the light scattering surface. Furthermore, upon exiting the light scattering chamber, the electromagnetic radiation may impinge upon the reflective surface from multiple angles of incidence. The light scattering surface of the light scattering chamber may be an irregularly uneven reflective surface. The irregularly uneven surface may be a crumpled foil.

In some embodiments, the light scattering chamber includes a first opening that can receive a portion of the graphical code reader, and a second opening that may be placed adjacent the graphical code. The first opening may have a larger diameter than the second opening, such that the light scattering chamber is tapered from adjacent the first opening toward the second opening.

The graphical code reading apparatus may also include a transmissive diffuser insert disposed between the illumination source of the graphical code reader and the graphical code. The graphical code reading apparatus may also include a raised stand for maintaining the graphical code reader and the light scattering chamber in a raised, stationary position.

Another embodiment of the graphical code reading apparatus for reading a graphical code on a reflective surface is also disclosed. The graphical code reading apparatus includes a graphical code reader that has an illumination source and a detector. The illumination source emits electromagnetic radiation. The graphical code reading apparatus also includes an irregularly uneven reflective surface that can scatter the electromagnetic radiation emitted from the illumination source of the graphical code reader, such that the electromagnetic radiation impinges upon the reflective surface from multiple angles of incidence.

The electromagnetic radiation from the illumination source of the graphical code reader may be reflected randomly in multiple directions upon interaction with the irregularly uneven reflective surface. In some embodiments the irregularly uneven reflective surface is crumpled foil. The graphical code reading apparatus may also include a transmissive diffuser insert disposed between the illumination source and the graphical code.

In some embodiments the irregularly uneven reflective surface is disposed on an interior portion of a light scattering chamber. The light scattering chamber may include a first opening that receives a portion of the graphical code reader. The light scattering chamber may also include a second opening that may be placed adjacent the graphical code to be read. The diameter of the first opening may be larger than the diameter of the second opening, such that the light scattering chamber is tapered from adjacent the first opening toward the second opening.

A light scattering chamber for enabling a graphical code reader to read a graphical code on a reflective surface is also disclosed. The light scattering chamber may include an interior portion and an exterior portion. The light scattering chamber may also have a first opening that is configured to receive a portion of the graphical code reader. The light scattering chamber may also include a second opening for placement adjacent a graphical code. The second opening may be opposite from and smaller than the first opening. The light scattering chamber has a light scattering surface on the interior portion that can scatter electromagnetic radiation that is emitted from the graphical code reader. The light scattering surface scatters the electromagnetic radiation in random directions before the radiation impinges upon the graphical code on the reflective surface.

In some embodiments the light scattering surface is an irregularly uneven reflective surface that, according to one alternative may be a crumpled foil. The electromagnetic radiation may impinge upon the reflective surface from multiple angles of incidence upon exiting the light scattering chamber.

In some embodiments the light scattering chamber is tapered from adjacent its first opening toward the second opening. Moreover, the light scattering chamber may also include a transmissive diffuser insert disposed in the interior portion of the light scattering chamber. Furthermore, the light scattering chamber may also be removably attachable to the graphical code reader.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The phrase "integrally formed" refers to a body that is manufactured integrally, i.e., as a single piece, without requiring the assembly of multiple pieces. Multiple parts may be integrally formed with each other if they are formed from a single workpiece.

Figure 1:
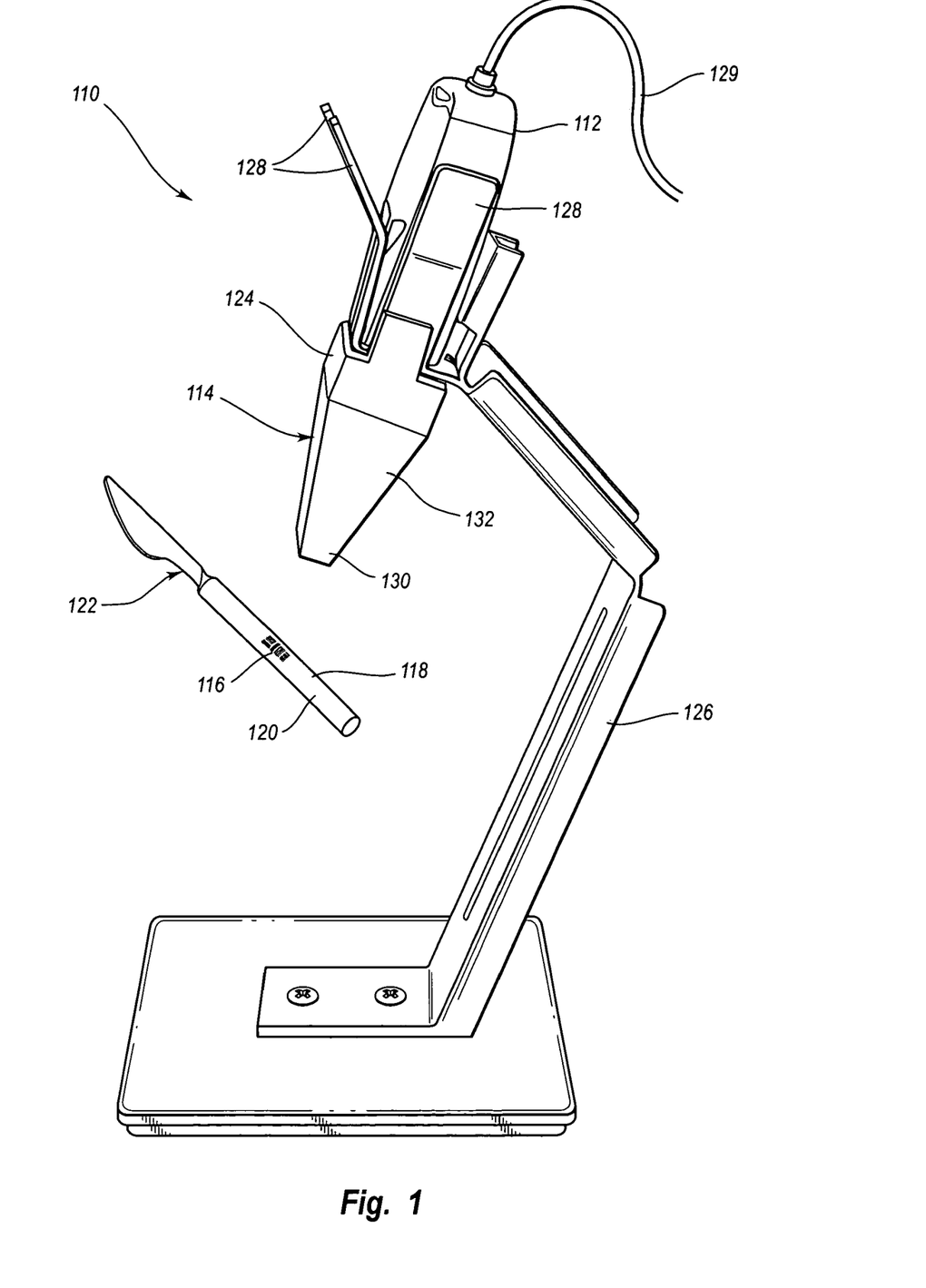
FIG. 1 is a perspective view of a graphical code reading apparatus with a graphical code reader coupled to one embodiment of a light scattering chamber on a raised stand while reading a two-dimensional graphical code on a reflective surface.

FIG. 1 is a perspective view of a graphical code reading apparatus 110 having a graphical code reader 112 coupled to a light scattering chamber 114 for reading a graphical code 116 on a reflective surface 118. As illustrated in FIG. 1, the graphical code 116 is a two-dimensional graphical code etched on the curved handle 120 of a medical device, such as a scalpel 122. The graphical code 116 may be a GoCode™ graphical code produced by the Code Corporation. Alternatively, the graphical code 116 may be a standard bar code or a data matrix code or MaxiCode as described above.

According to this embodiment, the graphical code reader 112 is coupled to the light scattering chamber 114 such that the illumination source and detector (not shown) are positioned proximate a first end 124 of the light scattering chamber 114. The light scattering chamber 114 and the graphical code reader 112 may also be coupled to a raised stand 126. The light scattering chamber 114 may be removably connected to or attached directly to the raised stand 126. The graphical code reader 112 may be positioned and maintained adjacent the first end 124 of the light scattering chamber 114 through the use of appendages 128 on the raised stand 126, which help to secure the graphical code reader 112 in place.

The raised stand 126 may be any type of structure for securing the graphical code reader 112 in communication with the light scattering chamber 114 in a raised position. The raised stand 126 maintains the graphical code reader 112 and light scattering chamber 114 in a raised stationary position so that the reflective surface 118 having the graphical code 116 etched thereon may receive illumination from the graphical code reader 112 and be read thereby.

The graphical code reader 112 typically also includes one or more communication interfaces 129 for communicating with other electronic devices, such as a computing device (not shown). The communication interfaces 129 may be based on wired communication technology such as a network cable 129. However, the communication interfaces 129 may be through wireless communication technology, or both wired and wireless. Examples of different types of communication interfaces 129 include a serial port, a parallel port, a Universal Serial Bus (USB) port, an Ethernet adapter, an IEEE bus interface, a small computer system interface (SCSI) bus interface, an infrared (IR) communication port, a Bluetooth wireless communication adapter, and so forth.

Referring still to FIG. 1, the light scattering chamber 114 has a second end 130 opposite the code reader-receiving first end 124. In order for the graphical code reader 112 to read the graphical code 116, the scalpel 122 having the graphical code 116 is placed in proximity to the second end 130 of the light scattering chamber 114. Illumination from the graphical code reader 112 exits the second end 130 of the light scattering chamber 114 to illuminate the graphical code 116. The illumination may be electromagnetic radiation having wavelengths in the visible spectrum, particularly in the red region of the visible spectrum. Alternatively, the electromagnetic radiation may have wavelengths in the infrared spectrum. Moreover, the illumination may be in both the infrared and visible spectra or other portions of the electromagnetic spectrum as apparent from one having skill in the art.

The illumination directed onto the reflective surface 118 having the graphical code 116 is reflected back to the graphical code reader 112 through the second end 130 of the light scattering chamber 114. The dark portions of the graphical code 116 absorb more of the incident radiation than the reflective surface 118. The differences in contrast of the reflected light allow the graphical code reader 112 to read the code. The reflected light signals are converted into electrical signals that correspond to graphical code data for determining the information contained therein. The conversion of light signals into electrical signals which are then decoded is accomplished using methods generally known in the art, and are therefore not detailed here.

According to one embodiment, the first end 124 of the light scattering chamber 114 has a greater diameter than its second end 130. As discussed above, the first end 124 may be large enough to receive the graphical code reader 112. The second end 130 has a diameter large enough to provide a sufficient area of illumination on the reflective surface 118 to illuminate the graphical code 116. Therefore, since according to the embodiment depicted in FIG. 1, the light scattering chamber 114 has ends 124, 130 with differing diameters, the light scattering chamber 114 has a tapered region 132. The tapered region 132 functions to focus the illumination from the reader 112 down onto the graphical code 116. Alternative embodiments of the light scattering chamber 114 may have cone angles that are different from those depicted in FIG. 1. For example, the light scattering chamber 114 may have walls that are substantially parallel to the scan direction of the graphical code reader 112. Consequently, the shape of the light scattering chamber 114 may be cylindrical, cubical, cone-shaped, pyramidal, or the like as apparent to one having skill in the art.

Figure 2:
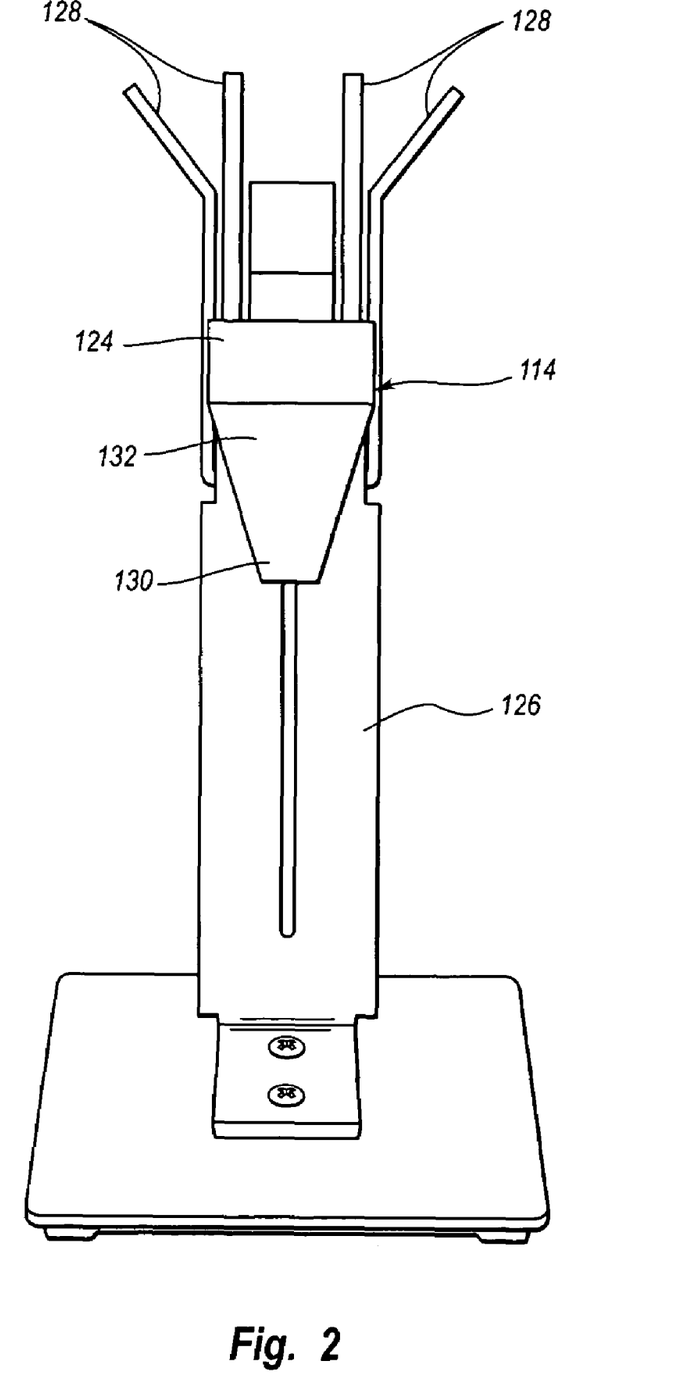
FIG. 2 is a perspective view of the light scattering chamber mounted on a raised stand as depicted in FIG. 1 as shown from the front without the graphical code reader.

FIG. 2 is a perspective view of the light scattering chamber 114 of FIG. 1 mounted on the raised stand 126, as shown from the front without the graphical code reader. The light scattering chamber 114 is mounted on the raised stand 126 so that it can receive a graphical code reader from above into its first end 124. This perspective view illustrates how the first end 124 of the light scattering chamber 114 has a greater diameter than the second end 130, providing a tapered region 132 between the first and second ends 124, 130. This tapered region 132 also provides for the function of focusing the source illumination from the graphical code reader onto a graphical code that is placed underneath the second end 130 of the light scattering chamber 114.

The light scattering chamber 114 is mounted on the raised stand 126 in such a manner as to allow the second end 130 of the light scattering chamber 114 to be a sufficient distance from ground in order to allow the placement of a graphical code underneath the chamber 114. The raised stand 126 further includes appendages 128 that allow for retention of graphical code reader in a stationary position. The appendages 128 may be bent or angled away from each other to provide for easy insertion and removal of a graphical code reader.

Figure 3:
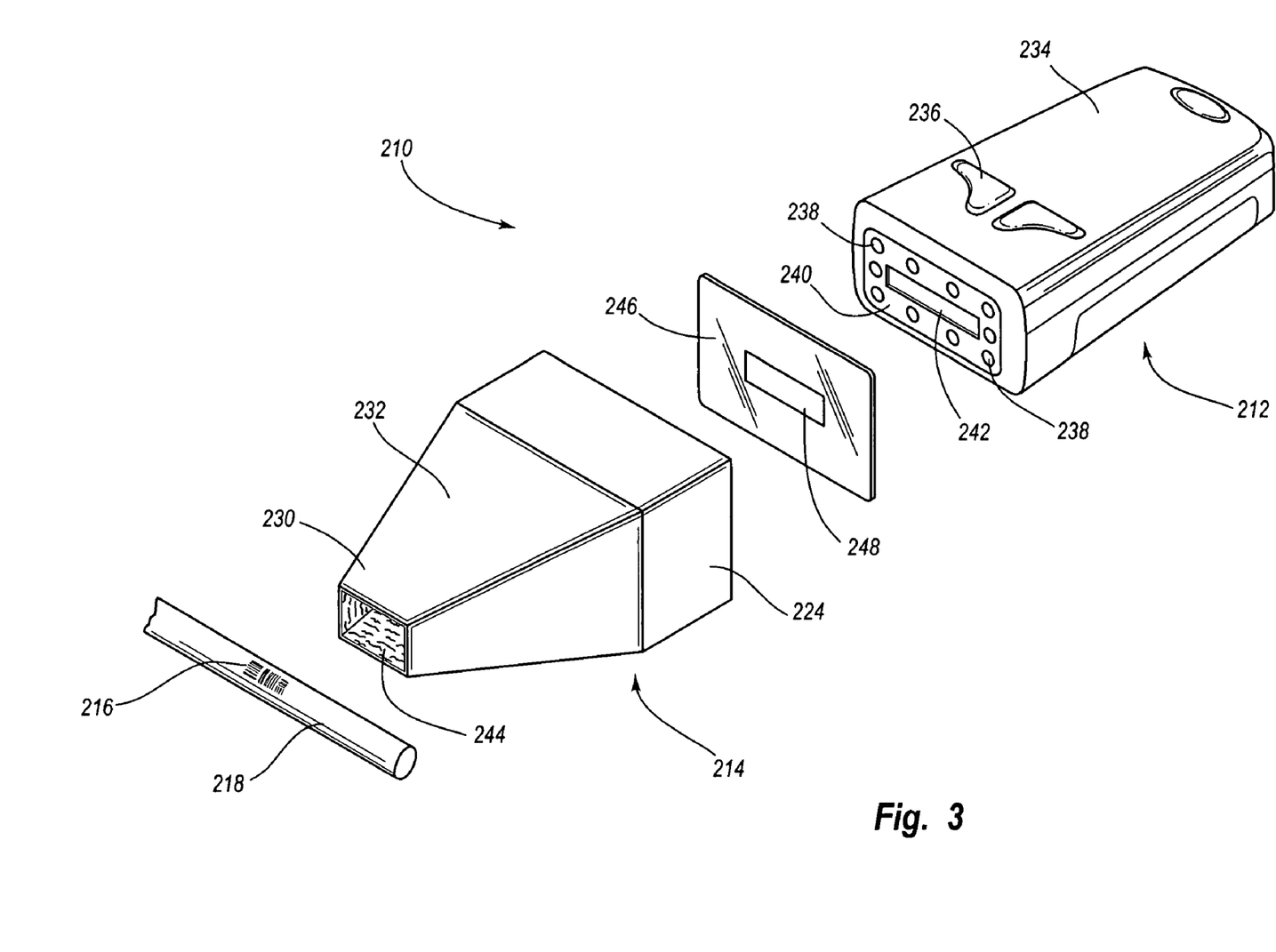
FIG. 3 is an exploded perspective view of an alternative embodiment of the graphical code reading apparatus depicting a light scattering chamber that may be coupled to a handheld graphical code reader.

FIG. 3 is an exploded perspective view of another embodiment of the graphical code reading apparatus 210 depicting a light scattering chamber 214 that may be coupled to a hand-held graphical code reader 212. In the embodiment illustrated, the graphical code reader 212 may be attachable to the light scattering chamber 214. Alternatively, the light scattering chamber 214 may be integrally formed with the graphical code reader 212. The graphical code reader 212 includes a housing 234 that surrounds the internal components of the graphical code reader 212. One or more buttons 236 may be included on the graphical code reader 212 for turning on and off various features of the reader 212.

According to the embodiment depicted, the graphical code reader 212 is hand-held and battery operated. However, it will be appreciated by those skilled in the art that various methods may be used to provide power to the graphical code reader 212. For example, the graphical code reader 212 may alternatively be provided power through a power cord.

The graphical code reader 212 may have a plurality of illumination light sources 238 mounted on a front face 240 of the graphical code reader 212 to provide illumination for a target scanning area. However, the illumination light sources 238 may be disposed on alternative locations on the graphical code reader 212, and are not restricted to placement on the front face 240. In the embodiment shown and described herein, the illumination light sources 238 take the form of light emitting diodes ("LEDs"). The LEDs 238 are arranged in a configuration to provide an appropriate amount of illumination for the target scanning area. Those skilled in the art will appreciate the various kinds of LEDs that may be used and the many different ways in which the LEDs may be configured. For example, the illumination produced by the LEDs may have wavelengths in the visible spectrum, infrared spectrum or both the infrared and visible spectrums or other portions of the electromagnetic spectrum as would be apparent from one having skill in the art.

The graphical code reader 212 also includes a detector 242 that is exposed to the surrounding environment through a window on the front face 240 of the graphical code reader 212. The detector 242 operates to process an image obtained when a graphical code 216 is illuminated by the illumination light sources 238. The term detector may refer to a photo sensitive grid for measuring the intensity of incident photons. Such a detector 242 may be a solid state photodetecting device containing a relatively large number of light sensitive pixels that are arranged in horizontal rows and vertical columns and that are capable of being read electronically to provide a two-dimensional representation of the object being imaged. Alternatively, the detector 242 may be those photodetecting devices known in the art for reading horizontal graphical codes, such as bar codes. The detector 242 may be, by way of example only, a CMOS device, a CCD device, etc., which are well known by those skilled in the art and are commercially available.

The light scattering chamber 214 is similar to that described in conjunction with FIGS. 1 and 2, in that it has a first end 224 with a first opening (not shown) for receiving the graphical code reader 212. The light scattering chamber 214 has a second end 230, opposite the first end 224 which has a second opening 244 where illumination from the graphical code reader 212 may exit the light scattering chamber 214 to illuminate the graphical code 216. The illumination directed onto the reflective surface 218 having the graphical code 216 is reflected back to the detector 242 on the front face 240 of the graphical code reader 212 through the second opening 244.

The dark portions of the graphical code 216 absorb more of the incident radiation than does the reflective surface 218. The differences in contrast of the reflected light allow the graphical code reader 212 to read the code. The reflected light signals are converted into electrical signals that correspond to graphical code data for determining the information contained therein.

The first opening of the light scattering chamber 214 may have a greater diameter than the second opening 244 because the first opening is sufficiently large to receive the front face 240 of the graphical code reader 212. The second opening 244 has a diameter large enough to provide a sufficient area of illumination on the reflective surface 218 to illuminate the graphical code 216. Therefore, the light scattering chamber 214 has a tapered region 232 between its first and second ends 224, 230. The tapered region 232 functions to focus the illumination from the illumination light sources 238 down toward the second opening 244 of the light scattering chamber 214.

The graphical code reading apparatus 210 may optionally include a transmissive diffuser insert 246 disposed between the front face 240 of the graphical code reader 212 and the light scattering chamber 214. The transmissive diffuser insert 246 is a frosted diffuser for diffusing radiation from the illumination light sources 238. The transmissive diffuser insert 246 is an optical device that alters the spatial distribution of radiation from the illumination light sources 238 and spreads the light evenly. The transmissive diffuser insert 246 may be a translucent glass or plastic that is placed somewhere between the illumination light sources 238 and the graphical code 216 to provide even illumination to the graphical code 216 and soften the shadows. According to some embodiments, the use of the transmissive diffuser insert 246 is not necessary.

According to the embodiment illustrated in FIG. 3, the transmissive diffuser insert 246 includes a window 248 that conforms to the size of the detector 242 on the front face 240 of the graphical code reader 212. The window 248 allows for the detector 242 to receive a clear reflected image of the graphical code 216 without the reflected image being impeded by the transmissive diffuser insert 246. However, the diameter of the window 248 is small enough so that the illumination from the LEDs 238 passes through the translucent portion of the diffuser insert 246 instead of the window 248. Consequently, the transmissive diffuser insert 246 is configured to diffuse radiation from the illumination light sources 238, but not diffuse radiation that is reflected to the detector 242.

Figure 4:
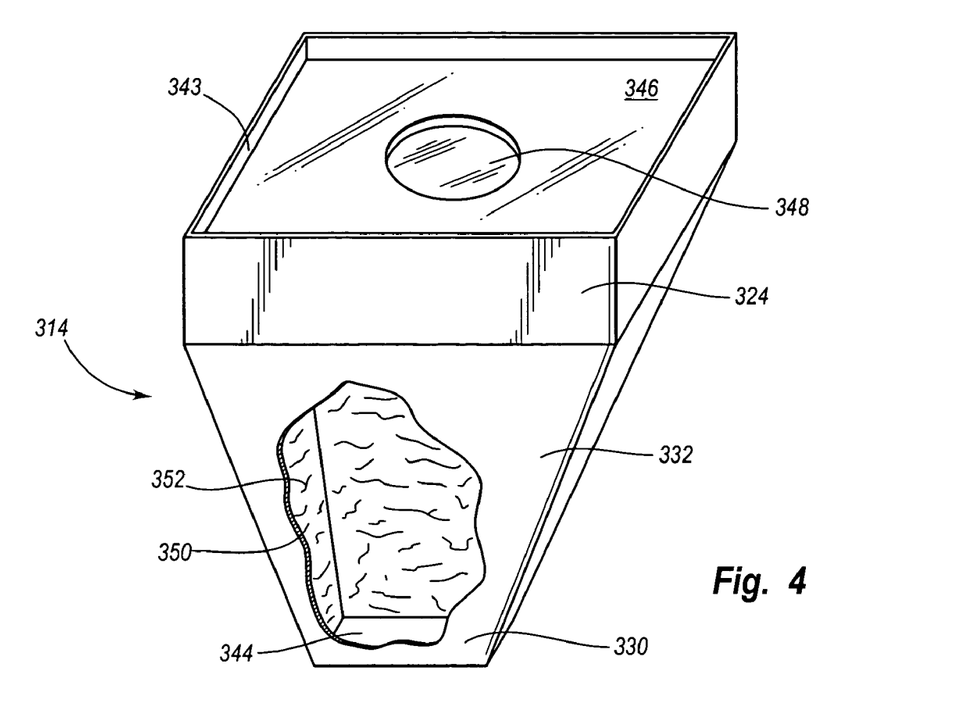
FIG. 4 is a partially cut-away perspective view of another embodiment of the light scattering chamber that may be coupled to a graphical code reader.

FIG. 4 is a partially cut-away perspective view of another embodiment of the light scattering chamber 314 that may be coupled to a graphical code reader. The light scattering chamber 314 has a first end 324 with a first opening 343 for receiving a transmissive diffuser insert 346 and the front face of a graphical code reader (not shown). The second end 330 of the light scattering chamber 314 is opposite the first end 324 and has a second opening 344, which is placed adjacent the desired graphical code (not shown) to be read. The light reflected from the reflective surface having the graphical code is reflected back to the detector of the graphical code reader through a window 348 in the transmissive diffuser insert 346. According to this particular embodiment of the transmissive diffuser insert 346, the window 348 is circular to receive a corresponding circular detector on the graphical code reader.

The interior portion 350 of the light scattering chamber 314 has a light scattering surface 352 for effectively scattering radiation from the illumination source of the graphical code reader in a non-uniform, random manner. The light scattering surface 352 is an irregularly uneven reflective surface that is randomly oriented in order to scatter light non-uniformly. According to one embodiment, the light scattering surface 352 may be constructed of reflective aluminum tape that is crinkled or crumpled throughout. Alternatively, the light scattering surface 352 may be constructed of a crinkled or crumpled reflective foil that is adhered to the interior sides of the light scattering chamber 314.

Accordingly, most of the radiation from the illumination source is non-collimated when it exits the second opening 344 of the light scattering chamber 314. This allows the graphical code to be illuminated from light incident at various angles, which provides even illumination across the reflective surface. This randomized radiation allows for effective viewing of graphical codes on reflective and curved surfaces by eliminating the shadows and glare associated with reading graphical codes on reflective surfaces in the conventional manner.

Figure 5:
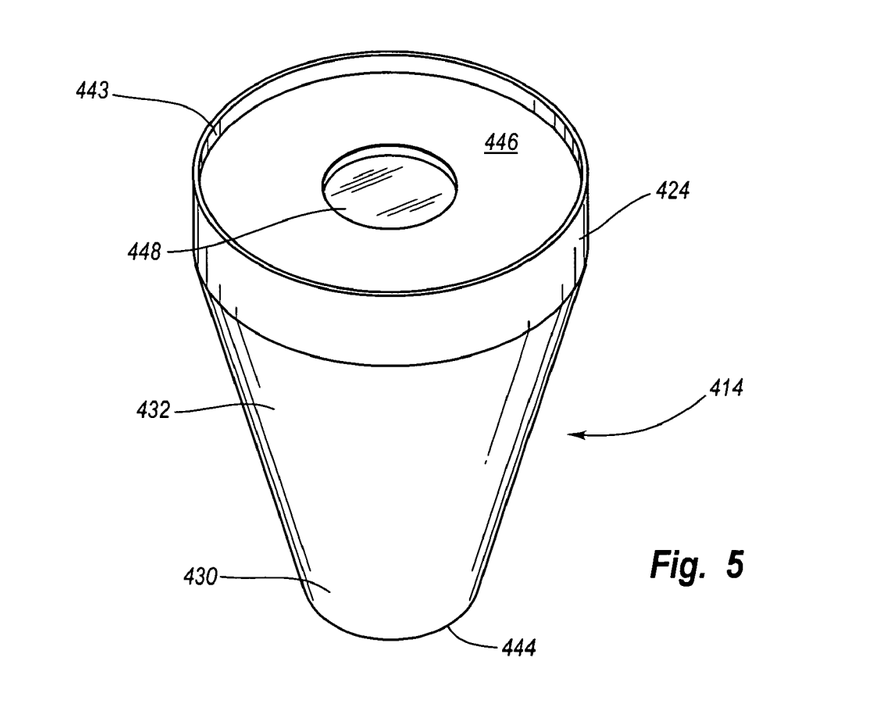
FIG. 5 is a perspective view of an alternative embodiment of the light scattering chamber that may be coupled to a graphical code reader.

FIG. 5 is a perspective view of another embodiment of a light scattering chamber 414 that may be coupled to a graphical code reader (not shown). Unlike the somewhat pyramidal shape of the light scattering chambers heretofore described, this embodiment is shaped more like a cone. The light scattering chamber 414 may take the form of alternative shapes and configurations in providing the desirable light scattering function. Alternatively, a light scattering surface may be used instead of a chamber.

The light scattering chamber 414 has a first end 424 with a first opening 443 for receiving a transmissive diffuser insert 446. This transmissive diffuser insert 446 is circular in shape, conforming to the shape of the first opening 443 of the light scattering chamber 414. The transmissive diffuser insert 446 also has a window 448 through which the detector of a graphical reader may be positioned. The walls of the chamber 414 provide a tapered region 432 toward a second end 430 where a second opening 444 is located. The second opening 444 has a diameter less than that of the first opening 443. This light scattering chamber 414 may be used with a hand-held graphical code reader, or incorporated into a stationary stand arrangement as described in conjunction with FIGS. 1 and 2.

Figure 6:
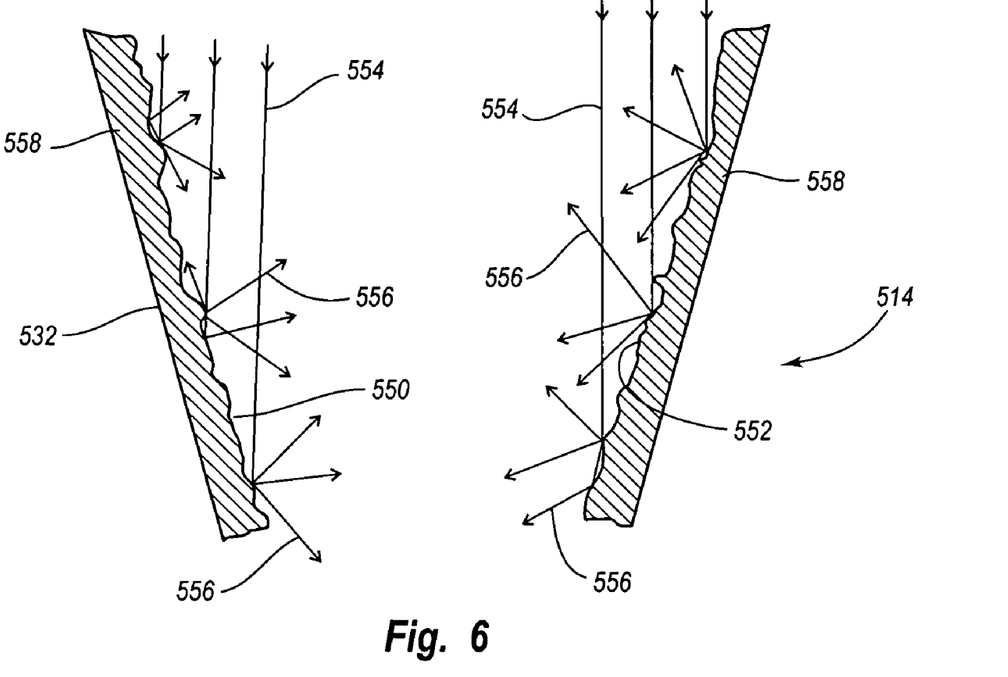
FIG. 6 is a partially cut-away cross sectional view of the light scattering chamber illustrating an exemplary ray diagram of light scattering off of the interior surface of the chamber.

FIG. 6 is a partially cut-away cross sectional view of a light scattering chamber 514, illustrating the interaction of incident radiation 554 in a ray diagram with a light scattering surface 552 on the interior 550 of the chamber 514. The portion of the light scattering chamber 514 illustrated is between both the first and second ends (not shown) where there is a tapered region 532. The interior 550 of the light scattering chamber 514 has a light scattering surface 552 that scatters radiation 554 from the illumination source of the graphical code reader in a non-uniform, random manner. This is accomplished through the use of an irregularly uneven reflective surface that reflects incident light 554 in a random fashion.

The reflection that takes place when the incident radiation 554 intersects the light scattering surface 552 is considered diffuse reflection. Diffuse reflection occurs when the incident radiation 554 contacts a rough or irregular surface 552 which does not maintain the integrity of the incident wavefront. Consequently, the reflected radiation 556 does not leave at set angles, but is sent out in many directions usually bearing no simple relationship to the angle of incidence. The principles of diffuse reflection causes the dispersion of light from the illumination light sources and provides the randomized scattering of light that enhances the ability of a graphical code reader to read graphical codes on reflective and curved surfaces.

According to one embodiment, the light scattering surface 552 may be constructed of reflective aluminum tape that is crinkled or crumpled and applied to the interior of the walls 558 of the light scattering chamber 514. Alternatively, the light scattering surface 552 may be constructed of a crinkled reflective foil that is adhered to the interior walls 558 of the light scattering chamber 514. As would be apparent to those having skill in the art, alternative light scattering surfaces 552 may be used to create a surface that provides diffuse reflection.

The light scattering chamber 514 has a tapered region 532 so that the walls 558 of the chamber 514 intersect the incident radiation 554 that is produced by the graphical code reader (not shown). According to the embodiment illustrated in FIG. 3, the graphical code reader 212 has a series of LEDs 238 that are arranged around the perimeter of the front face 240 of the reader 212. Since the LEDs 238 may be located along the perimeter of the graphical code reader 212, the walls 558 of the tapered region 532 of the chamber 514 as illustrated in FIG. 5 intersect the incident radiation 554, such that the incident radiation 554 may be scattered in a random fashion and focused toward the second opening (not shown). Alternatively, the LEDs may be placed at a location different from the graphical code reader's front face.

Accordingly, most of the radiation from the illumination source is non-collimated when it exits the second opening of the light scattering chamber 514. This allows the graphical code to be illuminated by the reflected radiation 556 incident at multiple angles. This randomized radiation 556 allows for effective viewing of graphical codes on reflective and curved surfaces by eliminating the shadows and glare associated with conventional methods of reading graphical codes.

Figure 7:
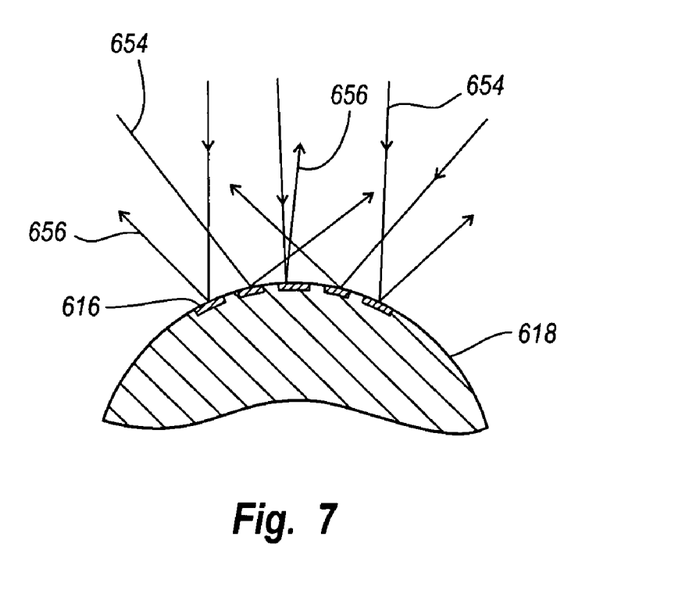
FIG. 7 is a partially cut-away cross sectional view of a highly reflective curved surface illustrating an exemplary ray diagram of light reflecting off of the surface after having been scattered by a light scattering chamber.

FIG. 7 is a partially cut-away cross sectional view of a highly reflective curved surface 618. FIG. 7 also illustrates an exemplary ray diagram of incident radiation 654 reflecting off of the reflective curved surface 618 after having been scattered by a light scattering chamber (not shown). A graphical code 616 is placed on the reflective curved surface 618 through laser etching or through other techniques known to those having skill in the art. As is evident from FIG. 7, the radiation 654 that illuminates the graphical code 616 is incident the reflective curved surface 618 at various angles. This effect is the result of the light scattering chamber's ability to randomize light from the illumination source. The reflected radiation 656 is reflected back into the light scattering chamber to be detected by a graphical code reader as heretofore described. Consequently, the reflective surface 618 appears to reflect a multitude of point sources of light as viewed from the graphical code reader.

Figure 8:
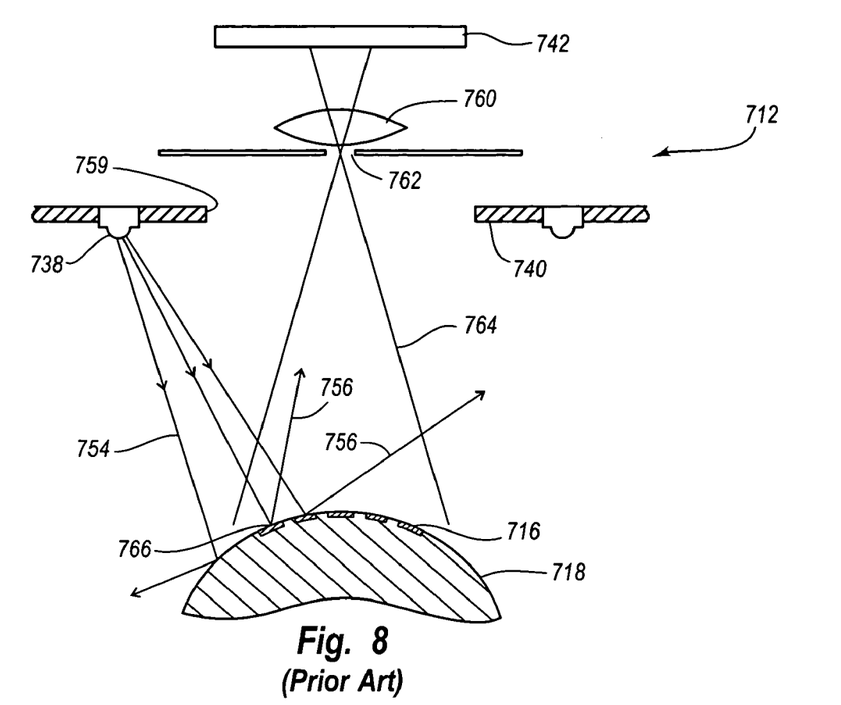
FIG. 8 is a cross sectional schematic view of various components of a graphical code reader illuminating a highly reflective curved surface without a light scattering chamber.

FIG. 8 is a cross sectional schematic view of various components of one embodiment of a graphical code reader 712 illuminating a highly reflective curved surface 718. This Figure represents what happens when a standard graphical code reader 712 attempts to read a graphical code 716 etched on the curved reflective surface 718 without the aid of the light scattering chamber. The graphical code reader 712 may have a plurality of illumination light sources 738 mounted on a front face 740 or other alternative location to illuminate the graphical code 716. As described herein, the illumination light sources 738 may be LEDs.

The graphical code reader 712 also includes a detector 742 for measuring the intensity of incident photons that are reflected off of the reflective surface 718. As discussed previously, the detector 742 may be a solid state photodetecting device containing a relatively large number of light sensitive pixels that are arranged in horizontal rows and vertical columns and that are capable of being read electronically to provide a two-dimensional representation of the object being imaged.

According to the embodiment illustrated in FIG. 8, the graphical code reader 712 has a window 759 in its front face 740 to allow reflected radiation 756 to be detected by the detector 742. A lens 760 within the graphical code reader 712 may be located adjacent the detector 742 to focus the reflected radiation 756 onto the detector 742. Between the window 759 and the lens 760 an aperture 762 may be positioned to limit the reflected radiation 756 that is incident upon the detector 742. Alternatively, the aperture 762 may be located between the lens 760 and the detector 742. According to the embodiment depicted in FIG. 8, the aperture 762 defines the field of view 764 of the detector 742. The field of view 764 is the cone-shaped space that is exposed to the detector 742. The intensity of photons that are reflected into the field of view 764 will be measured by the detector 742. Photons that are reflected outside of the field of view 764 will not be measured by the detector 742. Consequently, the graphical code 716 should be located within the detector's field of view 764 in order to be read and decoded. Those having skill in the art will recognize that the arrangement of components of the graphical code reader 712 may vary. The embodiment shown is exemplary and is not a required arrangement of components.

The illumination light source 738 that may be disposed on the front face 740 of the graphical code reader 712 emits incident radiation 754 that illuminates the graphical code 716 on the reflective curved surface 718. Because the surface 718 is reflective, the intensity of the incident radiation 754 is not significantly different from the reflected radiation 756. However, because the reflective surface 718 is curved, most of the reflected radiation 756 is reflected outside of the field of view 764.

A single point 766 on the reflective curved surface 718 reflects radiation 756 from the LED 738 into the field of view 764 to be detected by the detector 742. Since the intensity of light reflected 756 from that single point 766 is close to that of the incident radiation 754, a single bright spot is reflected onto the detector 742. This poses an image processing problem because the intensely illuminated point 766 makes the rest of the surrounding reflective surface 718 measure low in comparison. Consequently, areas outside this hot spot 766 contain lower levels of reflected radiation 756 and the detector 742 registers almost no energy in comparison to the single point 766. Therefore, images outside of the single point 766 are difficult to be detected or distinguished by the detector 742.

Figure 9:
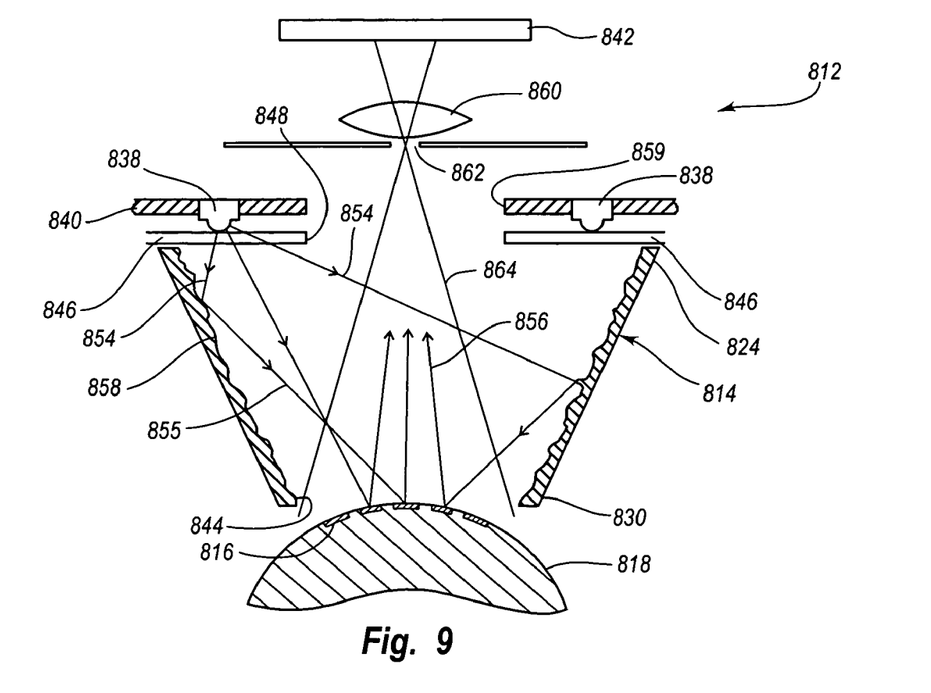
FIG. 9 is a cross sectional schematic view of components of a graphical code reader and light scattering chamber illuminating a highly reflective curved surface.

FIG. 9 is a cross sectional schematic view of components of one embodiment of a graphical code reader 812 and a light scattering chamber 814 illuminating a highly reflective curved surface 818. As shown in FIG. 8, the graphical code reader 812 of FIG. 9 also has a plurality of illumination light sources 838 mounted on a front face 840 to illuminate the graphical code 816. However, the illumination light sources 838 may be disposed on alternative locations of the graphical code reader 812. The graphical code reader 812 also may include a detector 842, a lens 860, and an internal aperture 862 which defines a field of view 864 of the detector 842. The arrangement of the components of the graphical code reader 812 illustrated in FIG. 9 are exemplary, and are not intended to indicate a required arrangement of components.

According to one embodiment, a light scattering chamber 814 is disposed between the graphical code reader 812 and the reflective curved surface 818. The light scattering chamber 814 has a first end 824 adjacent the graphical code reader 812 and a second end 830 that is positioned adjacent the graphical code 816 on the reflective surface 818. A transmissive diffuser insert 846 may optionally be located at the second end 830 of the light scattering chamber 814 to diffuse the incident radiation 854 from the illumination light sources 838 and spread the light evenly. The transmissive diffuser insert 846 may also have a window 848 that corresponds to a window 859 in the front face 840 of the graphical code reader 812 so as to prevent the diffusion of reflected radiation 856 that is detected by the detector 842.

When the incident radiation 854 impinges upon the walls 858 of the light scattering chamber 814, the radiation is scattered 855 in random directions. Much of this scattered radiation 855 is incident upon the highly reflective surface 818 from multiple angles. Therefore, instead of having a single point of reflected radiation 856 (as illustrated in FIG. 8), the arrangement shown in FIG. 9 creates multiple spots of reflected light 856 across the entire reflective surface 818. Due to the reflectivity of the surface 818, the reflected radiation 856 retains a high intensity across the graphical code 816 within the field of view 864. Image processing is improved when, from the perspective of the detector 842, the entire surface 818 is illuminated instead of a single point as shown in FIG. 8.

As was mentioned previously, the light scattering chamber 814 may have an opening 844 at its second end 830. The aperture 862 within the graphical code reader 812 may be sized so that the field of view 864 corresponds to the size of the opening 844. Windowing down the field of view 864 to the size of the opening 844 essentially eliminates the detection of background radiation that is caused from light that is scattered off of the light scattering chamber 814 back toward the detector without ever reflecting off of the surface 818.

In alternative embodiments, the field of view 864 does not necessarily correspond to the size of the opening 844. In some instances it may be desirable for the detector 842 to view a portion of the sides of the light scattering chamber 814 to give more equal distribution of electromagnetic radiation for the algorithms used to decode the graphical code 816 read by the graphical code reader 812. Alternatively, the field of view 864 may be determined by effectively turning off pixels of the detector 842 that measure radiation intensity outside of the desired field of view 864.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A graphical code reading apparatus for reading a graphical code on a reflective surface, comprising:
   a graphical code reader having an illumination source and a detector; and
   a light scattering chamber disposed between the graphical code reader and the graphical code, the light scattering chamber comprising:
   an interior portion that receives electromagnetic radiation from the illumination source;
   a light scattering surface on the interior portion that scatters the electromagnetic radiation emitted from the illumination source; and
   a transmissive diffuser insert that includes a window, wherein the detector receives a reflected image of the graphical code without the reflected image being impeded by the transmissive diffuser insert, and wherein the transmissive diffuser insert is located within the interior portion of the light scattering chamber, wherein the transmissive diffuser insert is located in an area of the interior portion of the light scattering chamber that is not tapered.

2. The graphical code reading apparatus of claim 1, wherein the electromagnetic radiation from the illumination source is reflected randomly in multiple directions upon interaction with the light scattering surface.

3. The graphical code reading apparatus of claim 1, wherein the electromagnetic radiation impinges the reflective surface from multiple angles of incidence upon exiting the light scattering chamber.

4. The graphical code reading apparatus of claim 1, wherein the light scattering surface is an irregularly uneven reflective surface.

5. The graphical code reading apparatus of claim 4, wherein the irregularly uneven reflective surface is crumpled foil.

6. The graphical code reading apparatus of claim 1, wherein the light scattering chamber further comprises a first opening that receives a portion of the graphical code reader and a second opening for placement adjacent the graphical code.

7. The graphical code reading apparatus of claim 6, wherein the first opening has a larger diameter than the second opening.

8. The graphical code reading apparatus of claim 7, wherein the light scattering chamber is tapered from adjacent the first opening toward the second opening.

9. The graphical code reading apparatus of claim 1, wherein the transmissive diffuser insert is disposed between the illumination source and the graphical code.

10. The graphical code reading apparatus of claim 1, further comprising a raised stand that maintains the graphical code reader and the light scattering chamber in a raised, stationary position.

11. A graphical code reading apparatus for reading a graphical code on a reflective surface, comprising:
- a graphical code reader having an illumination source and a detector, the illumination source emitting electromagnetic radiation;
- a transmissive diffuser insert that includes a window, wherein the detector receives a reflected image of the graphical code without the reflected image being impeded by the transmissive diffuser insert, and wherein the transmissive diffuser insert is located within an interior portion of a light scattering chamber, wherein the transmissive diffuser insert is located in an area of the interior portion of the light scattering chamber that is not tapered; and
- an irregularly uneven reflective surface that scatters the electromagnetic radiation emitted from the illumination source, such that the electromagnetic radiation impinges the reflective surface from multiple angles of incidence.

12. The graphical code reading apparatus of claim 11, wherein the electromagnetic radiation from the illumination source is reflected randomly in multiple directions upon interaction with the irregularly uneven reflective surface.

13. The graphical code reading apparatus of claim 11, wherein the irregularly uneven reflective surface comprises crumpled foil.

14. The graphical code reading apparatus of claim 11, wherein the transmissive diffuser insert is disposed between the illumination source and the graphical code.

15. The graphical code reading apparatus of claim 11, wherein the irregularly uneven reflective surface is disposed on an interior portion of a light scattering chamber.

16. The graphical code reading apparatus of claim 15, wherein the light scattering chamber comprises a first opening that receives a portion of the graphical code reader and a second opening for placement adjacent the graphical code.

17. The graphical code reading apparatus of claim 16, wherein the first opening has a larger diameter than the second opening, such that the light scattering chamber is tapered from adjacent the first opening toward the second opening.

18. A light scattering chamber for enabling a graphical code reader to read a graphical code on a reflective surface, comprising:
- an interior portion and an exterior portion;
- a first opening configured to receive a portion of the graphical code reader;
- a second opening for placement adjacent a graphical code, the second opening opposite from and smaller than the first opening;
- a light scattering surface on the interior portion that scatters electromagnetic radiation emitted from the graphical code reader in random directions before the electromagnetic radiation impinges upon the graphical code on the reflective surface; and
- a transmissive diffuser insert that includes a window, wherein the detector receives a reflected image of the graphical code without the reflected image being impeded by the transmissive diffuser insert, and wherein the transmissive diffuser insert is located within the interior portion of the light scattering chamber, wherein the transmissive diffuser insert is located in an area of the interior portion of the light scattering chamber that is not tapered.

19. The light scattering chamber of claim 18, wherein the electromagnetic radiation impinges the reflective surface from multiple angles of incidence upon exiting the light scattering chamber.

20. The light scattering chamber of claim 18, wherein the light scattering surface is an irregularly uneven reflective surface.

21. The light scattering chamber of claim 20, wherein the irregularly uneven reflective surface is crumpled foil.

22. The light scattering chamber of claim 18, wherein the light scattering chamber is tapered from adjacent the first opening toward the second opening.

23. The light scattering chamber of claim 18, wherein the transmissive diffuser insert is disposed in the interior portion of the light scattering chamber.

24. The light scattering chamber of claim 18, wherein the light scattering chamber is removably attachable to the graphical code reader.

* * * * *